April 11, 1944.   R. E. NAGLE ET AL   2,346,501
APPARATUS FOR SUBJECTING FLUIDS TO CONTACT
WITH SOLID PULVERULENT MATERIAL
Filed Sept. 28, 1940
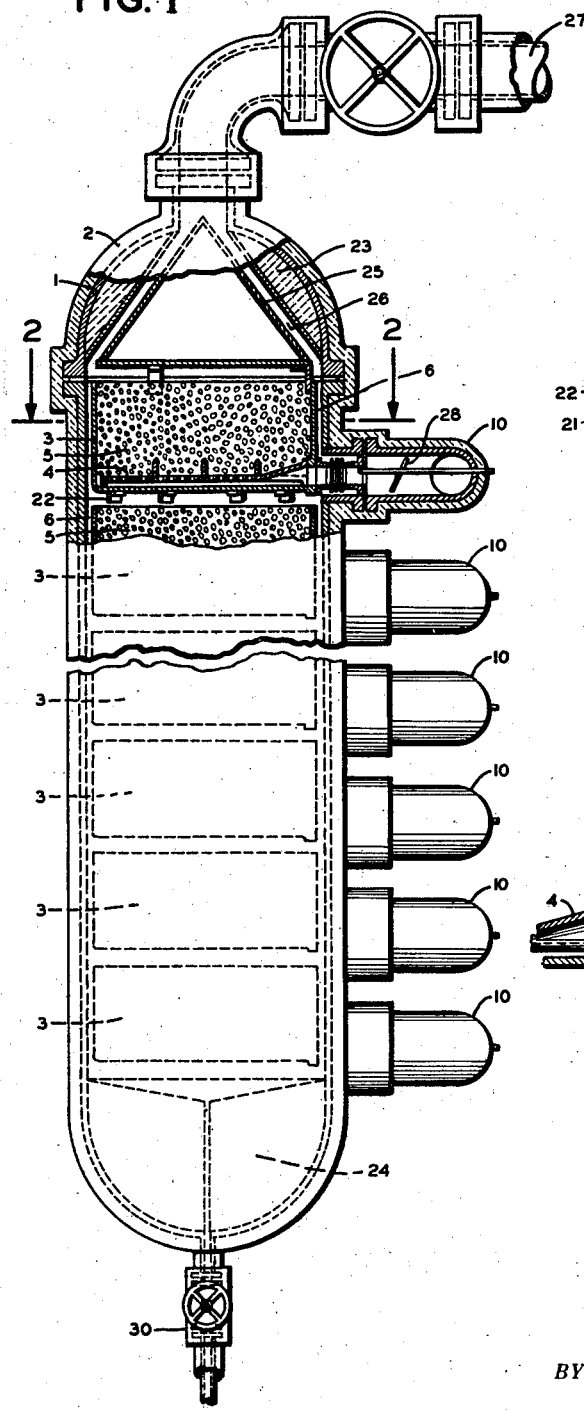
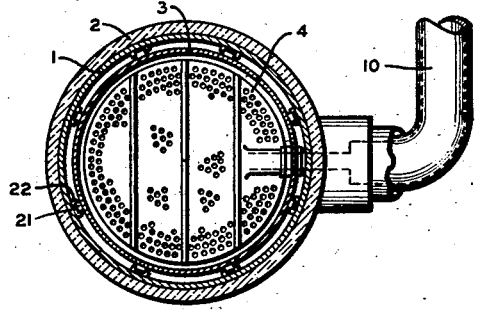
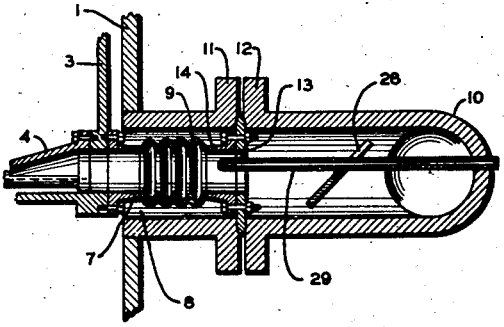
DAVID K. BEAVON
RICHARD E. NAGLE
INVENTORS
BY
THEIR ATTORNEYS Patented Apr. 11, 1944

2,346,501

UNITED STATES PATENT OFFICE 2,346,501

APPARATUS FOR SUBJECTING FLUIDS TO CONTACT WITH SOLID PULVERULENT MATERIAL

Richard E. Nagle, New York, and David K. Beavon, Fleetwood, N. Y., assignors, by mesne assignments, to The Texas Company, New York, N. Y., a corporation of Delaware Application September 28, 1940, Serial No. 358,794

5 Claims. (Cl. 23—288)

This invention relates to apparatus for and method of subjecting fluids to contact with solid pulverulent material and particularly to contact with a material which is periodically reactivated or revivified at relatively high temperature.

The invention contemplates effecting the contact treatment in a vessel containing a plurality of contact masses through which the material undergoing treatment is passed in parallel flow.

The invention contemplates employing a contact apparatus which comprises a closed vessel containing a plurality of receptacles, each of which contains a bed of contact material. The receptacles are spaced apart from each other and from the interior wall or surface of the vessel so that the receptacles are surrounded with fluid material introduced to the vessel for contact with the material. Conduits having suitable control valves are provided for separately removing fluid accumulating in the interior of each receptacle and for separately withdrawing the removed fluid from the vessel.

The apparatus is thus arranged to provide parallel flow of fluid through the separate contact masses or beds within the vessel and for maintaining an equal distribution of fluid flow through the masses or beds during the treating process and also during regeneration of the contact material.

The invention has particular application in the catalytic treatment of petroleum hydrocarbons, such as, for example, in the catalytic cracking of hydrocarbons for the production of low boiling hydrocarbons suitable in the manufacture of motor fuel. The catalyst may be made up of particles, lumps, pellets or pills and the like and may be a silicious material, such as natural or artificial compounds of silica and alumina, with or without the addition of other active substances, such as certain metals in finely divided form including nickel, copper, cobalt, manganese, etc.

The invention is applicable to various catalytic treating operations involving conversion or chemical transformation wherein deposition of carbonaceous material or other impurities upon the catalyst particles occurs necessitating periodic reactivation of the catalyst. Such reactivation is usually accomplished by interrupting the flow of feed to the contact mass and then blowing air or flue gas containing oxygen through the mass to burn the deposited carbon and/or other impurities and thereby restore the catalyst to its active state.

The invention is also applicable to other types of contact treatment such as the desulfurization of gases or liquids by contact with solid pulverulent material such as metallic oxides.

An object of the present invention is to facilitate reactivation of the catalyst or other contact material to avoid substantial injury and destruction of the particles and also to reduce the cost of reactivation.

Accordingly, the invention involves employing plurality of relatively shallow beds of contact material through which the charge or the reactivating medium is passed in parallel flow. The beds are contained within separate pans or receptacles within a closed vessel, each pan or receptacle having separately controlled outlets extending to the exterior of the vessel so as to provide a means for maintaining equal and uniform distribution of fluid flow through each pan or receptacle and, therefore, through each contact bed. By providing parallel flow of fluid through a plurality of beds within the reaction vessel it is possible to avoid excessive pressure drop through the treating or reaction zone such as prevails when a reactivating medium is passed through a substantial depth of contact material in sufficient volume in order to reactivate the mass in a short time without excessive temperature rise. In order to describe the invention further, reference will now be made to the figures of the accompanying drawing which illustrate the invention in diagrammatic form.

As indicated in Fig. 1, the converter comprises a cylindrical vertical vessel 1, the exterior surface of which is lagged with a suitable heat insulating material 2.

A plurality of receptacles 3 are supported, one above the other within the vessel 1. Each receptacle comprises a cylindrical container with an open top. Each container has a false bottom formed by a screen or perforated sheet 4. The sheet 4 provides a support upon which the catalyst or contact material 5 in pulverulent form rests. As indicated, the portion of the receptacle 3 above the sheet 4 may be substantially filled with the contact material. The depth of the bed in each container may be around 2 feet, for example, although it may vary considerably from this depth as, for example, over the range from 1 foot to several feet.

These receptacles have an outside diameter somewhat shorter than that of the inner diameter of the vessel 1 thereby providing a space 6 between the receptacles and the inner wall of the vessel. This annular space extends throughout the entire length of the vessel. Also as shown in the drawing each receptacle is spaced vertically apart so that in operation each receptacle is surrounded with the fluid contained within the vessel 1.

Advantageously, provision may be made for insulating the vertical surface of the receptacles 3 so as to reduce the flow of heat between the contact mass, the fluid passing through the annular space 6, and the surrounding wall of the vessel 1.

A horizontal conduit 7 is connected to the lowermost portion of each receptacle 3. This conduit extends into a tubular and adjacent port 8 provided in the wall of the vessel 1. The conduit 7 is composed in part of an expansion bellows 9.

The port 8 is in flanged communication with a pipe elbow 10 or other pipe connection as may be desired.

The flange plates 11 and 12 forming the flange connection between the port 8 and pipe 10 are adapted to receive a ring gasket 13 to which the bellows 9 of conduit 7 is connected by means of a flange 14. By this means a fluid tight connection is provided between the bottom of the receptacle 3 and the pipe 10. Also, by virtue of the bellows section, provision is made for lateral and vertical movement of the receptacle due to thermal expansion or contraction of the metal.

The pipe 10 provides means for connection with a receiver or accumulating drum not shown in the drawing for receiving the fluid drawn off from the bottom of each receptacle.

Each receptacle 3 is provided with a plurality of lugs 22, which in turn rest upon lugs 22 welded to the interior surface of the vessel 1. Thus, sets of these lugs 22 are attached at intervals throughout the vessel 1 so as to permit supporting a plurality of receptacles within the vessel. If desired the receptacles may be placed on horizontal supporting bars. The number of receptacles placed within the vessel may be varied as desired.

As indicated in Fig. 1 each receptacle is provided with a separate draw-off pipe 10 such as has already been described.

Where the apparatus is used for high temperature reactions, such as in the catalytic cracking or thermal conversion of hydrocarbons and where it is undesirable to accumulate stagnant bodies of oil or oil vapor confined at high temperatures, it is desirable to reduce the volume of dead spaces within the vessel, particularly in the extremities of the vessel. For this purpose the hollow spaces 23 and 24 in the ends of the vessel 1 are filled with refractory cement or other material as indicated in the drawing. A hollow cone 25 is also placed in the top of the vessel in such a way as to provide an annular conical passage 26, communicating with the annular space 6 previously mentioned. The apex of the annular space terminates at a point adjacent the inlet of a pipe 27 at the top of the vessel.

The fluid for contact treatment or for regenerating the contact masses is introduced to the interior of the vessel 1 through the inlet pipe 27. Upon introduction it completely fills the annular spaces, and the spaces between the receptacles and is thus caused to enter the top of each receptacle. Parallel flow of the fluid through the contact bed contained in each receptacle thus occurs. After passage hrough each bed the fluid accumulates in the bottom of each receptacle and is discharged therefrom through the conduits 7 into the pipes 10.

As indicated in the figures of the drawing, each pipe 10 is provided with a valve or damper 28, the purpose of which is to regulate the flow of fluid outwardly through the pipe.

The valve 28 is illustrated in somewhat more detail in Fig. 3. As there shown it may comprise a circular damper rotatably supported within the pipe 10 so that it may be rotated into a position transverse to the direction of flow of the fluid through the pipe.

A thermometer well 29 extends through the elbow of the pipe 10, and also may extend through a slot in the damper 28 into the conduit 7. This provides means for determining the temperature of the fluid passing through the pipes 10.

By providing suitable piping connections and valves the fluid flowing through each pipe 10 may be withdrawn for sampling.

Connections may also be provided for meters to determine the rate of flow through each bed.

The annular space 6 besides providing means for distributing the fluid to each receptacle also permits maintaining a substantial body of fluid between the sides of the contact bed and the wall of the vessel, thus preventing excessively high temperatures in the contact bed from being transmitted to the wall of the vessel. Thus, in a vessel having an inside diameter of about 5 feet, the thickness of the annular space is about 1 inch.

The dampers or control valves 28 in each pipe 10 provide means for maintaining a constant flow of fluid through each bed in spite of minor changes in the pressure drop through the individual contact beds. The valve or damper settings may be adjusted during operation in order to offset small variations in pressure drop through the contact bed, and annular space, or through the connecting pipe work so as to insure uniform flow through each contact bed.

A valved outlet 30 is provided at the bottom of the vessel 1 through which to discharge any accumulated liquid material.

In actual operation, as for example during the catalytic cracking of hydrocarbon oil the oil is advantageously vaporized and heated to a conversion temperature ranging from 750 to 1000°. The heated oil vapor is introduced to the reaction vessel through the pipe 27. The heated oil vapor completely fills the interior of the vessel and surrounds each separate receptacle 3 so that in order to pass out of the vessel it must flow through each catalyst bed in parallel.

The vapors including products of reaction after passage through each bed accumulate in the bottom of each receptacle and the thus accumulated products are separately and continuously withdrawn from each receptacle through the pipes 10 as already explained. The pipes 10 may be manifolded together at a point beyond the individual damper valves 28 so as to commingle the produucts of reaction and accumulate them in the same receiver.

Charging of the hydrocarbon vapors through the reaction vessel 1 is continued for a substantial period of time, for example, ranging from around 10 minutes to 4 hours or more until the activity of the catalyst has decreased to such a point that regeneration is necessary.

When this point has been reached the introduction of hydrocarbon feed through the inlet 26 is discontinued and a purging gas is introduced to purge the interior of the vessel of any remaining hydrocarbons. Following this a reactivating medium comprising an oxygen-containing gas at a temperature of around 850–950° F. is introduced to the vessel. Consequently, during reactivation or regeneration the vessel is completely filled with the regenerating medium which also passes in parallel flow through each receptacle, thereby effecting combustion of the carbonaceous material deposited upon the catalyst particles. The resulting flue gas is discharged from each bed through the pipes 10. The rate of flow of activating gas as well as the oxygen content thereof is adjusted so as to maintain the temperature of the catalyst mass not in excess of about 1200° F.

The arrangement of apparatus illustrated is such that operation of the reaction vessel may be carried out with a relatively small pressure drop through each bed as, for example, around ½ to 5 lbs.

Obviously many modifications and variations of the invention, as hereinbefore set forth, may be made without departing from the spirit and scope thereof and therefore only such limitations should be imposed as are indicated in the appended claims.

We claim:

1. In a treating vessel for effecting contact between a solid pulverulent contact material and a fluid undergoing treatment, a contact receptacle comprising a pan for retaining a contact mass, a perforated plate within the pan spaced a short distance from its bottom for supporting the mass thereby providing a space between the bottom of the contact mass and the bottom of the pan, an outlet port in the bottom of said pan, a port in the wall of the vessel adjacent to the port in said pan and opening into a discharge pipe exterior of said vessel, a flexible conduit forming a discharge outlet from the port in said pan and extending a substantial distance within said discharge pipe, and means for forming a leakproof closure between the interior of said discharge pipe and the exterior of the extended portion of said conduit.

2. A treating vessel for effecting contact between a solid pulverulent contact material and a fluid undergoing contact treatment which comprises a closed chamber, an inlet port for admitting fluid feed thereto, a plurality of receptacles supported within the chamber to contain the contact material, each receptacle being spaced apart from each other and from the interior surface of the chamber to permit surrounding the receptacles with the fluid feed to the chamber and each receptacle having an opening to afford fluid communication between the interior of the receptacle and the interior of the chamber, an outlet port in each receptacle and in proximity to the bottom thereof, a corresponding port in the adjacent wall of the chamber, a flexible and expansible conduit providing fluid tight communication between said corresponding ports to thereby provide a discharge for fluid from each receptacle to the exterior of the chamber.

3. In a catalytic reactor comprising a closed vessel containing solid pulverulent catalytic material supported within trays positioned within the vessel, the combination with said vessel which comprises a tray to contain the catalyst, a port in said tray in proximity to the bottom thereof, a corresponding port of relatively larger internal cross-sectional area in the adjacent wall of said vessel and terminating in a flanged nipple extending externally from the vessel wall, a flanged discharge conduit coupled to said flanged nipple to form a flanged coupling, a ring gasket within said coupling, and a flexible and expansible conduit connected at one end to the port in said tray and having its other end terminate in said ring gasket thereby forming a fluid tight communication between the interior of said tray and the exterior of said vessel.

4. An apparatus according to claim 3 in which the discharge conduit is provided with a valve for controlling the flow of fluid therethrough.

5. In a catalytic reactor comprising a closed vessel containing solid pulverulent catalytic material supported within trays positioned within the vessel, the combination with said vessel which comprises a tray to contain the catalyst, a port in said tray in proximity to the bottom thereof, a corresponding port of relatively larger internal cross-sectional area in the adjacent wall of said vessel and terminating in a flanged nipple extending externally from the vessel wall, a flanged discharge conduit coupled to said flanged nipple to form a flanged coupling, a ring gasket within said coupling, a flexible and expansible conduit connected at one end to the port in said tray and having its other end terminate in said ring gasket thereby forming a fluid tight communication between the interior of said tray and the exterior of said vessel, and a thermocouple well extending into the discharge conduit in close proximity to the wall of said vessel.

RICHARD E. NAGLE.
DAVID K. BEAVON.